United States Patent
Thorwesten, Sr.

(10) Patent No.: US 6,887,292 B2
(45) Date of Patent: May 3, 2005

(54) SILO AND/OR FILTER DEVICE FOR INFLAMMABLE DRY BULK FREIGHT

(75) Inventor: Albert Thorwesten, Sr., Beckum (DE)

(73) Assignee: Thorwesten Vent GmbH, Beckum (DE)

( * ) Notice: Subject to any disclaimer, the term of this patent is extended or adjusted under 35 U.S.C. 154(b) by 106 days.

(21) Appl. No.: 10/221,932

(22) PCT Filed: Mar. 15, 2001

(86) PCT No.: PCT/EP01/02942
§ 371 (c)(1),
(2), (4) Date: May 19, 2003

(87) PCT Pub. No.: WO01/68221
PCT Pub. Date: Sep. 20, 2001

(65) Prior Publication Data
US 2003/0172630 A1 Sep. 18, 2003

(30) Foreign Application Priority Data
Mar. 17, 2000 (DE) .......................................... 100 13 117

(51) Int. Cl.[7] .......................... B01D 29/88; B01D 46/42
(52) U.S. Cl. ......................................... 55/310; 55/344
(58) Field of Search .......................... 55/309, 310, 312, 55/313, 344, 385.4; 52/192; 222/189.06

(56) References Cited

U.S. PATENT DOCUMENTS

| | | | | |
|---|---|---|---|---|
| 1,971,852 A | * | 8/1934 | Goebels | 366/107 |
| 3,252,402 A | * | 5/1966 | Burmeister | 99/646 R |
| 3,813,853 A | * | 6/1974 | Anderson | 95/279 |
| 4,159,151 A | * | 6/1979 | Wood | 406/162 |
| 4,701,080 A | * | 10/1987 | van Aalst | 406/109 |
| 4,793,838 A | * | 12/1988 | Thorne | 55/378 |
| 5,149,348 A | * | 9/1992 | Bissinger | 55/378 |
| 5,514,195 A | * | 5/1996 | Durst et al. | 55/302 |

FOREIGN PATENT DOCUMENTS

DE     28 17 746     10/1979

* cited by examiner

Primary Examiner—Frank M. Lawrence
(74) Attorney, Agent, or Firm—Collard & Roe, P.C.

(57) ABSTRACT

With a receiving silo and/or filter device for inflammable dry bulk materials comprising a substantially cylindrical wall, a lid, a dry bulk material feeding and discharging system, as well as a pressure relief element opening at a predetermined pressure rise in the container, in particular with an explosion door and filter elements associated with the container, the aim is to further develop a silo or filter device of the specified type in such a way that it is capable with as little constructional expenditure as possible to absorb the occurring mechanical stresses and to safely assure pressure relief at the same time.

10 Claims, 4 Drawing Sheets

SILO AND/OR FILTER DEVICE FOR INFLAMMABLE DRY BULK FREIGHT

CROSS REFERENCE TO RELATED APPLICATIONS

Applicant claims priority under 35 U.S.C. §119 of German Application No. 100 13 117.4, filed on Mar. 17, 2000. Applicant also claim priority under 35 U.S.C. §365 of PCT/EP01/02942, filed on Mar. 15, 2001. The international application under PCT article 21(2) was not published in English.

FIELD OF THE INVENTION

The invention relates to a receiving silo and/or a filter device for inflammable dry bulk materials of the type specified in the introductory part of claim 1.

BACKGROUND OF THE INVENTION

Pressure relief devices in the form of explosion flaps or bursting panes are employed in all locations where inflammable dry bulk materials are stored (silos, bunkers, etc.) or moved (filter installations). Such devices are expected to relieve the silo or the housing of pressure when explosions occur and protect them in this manner against damage.

In connection with such filter devices, the combustible dry bulk materials are sucked (or pressed) into the filter container by means of vacuum (or by means of excess pressure), and the air transporting the dry bulk material (for example coal dust) then exits through the filter elements, whereas the dust settles in the form of filter cake on the filter elements and is from time to time removed from the filter elements by means of devices blowing the latter free or the like, and conveyed into a silo.

In connection with filter devices with explosion protection, the filter devices usually consist of filter containers or housings with a rectangular shape, which are installed both in the area of the roof and also laterally adjacent to the filter elements, and equipped with explosion flaps. These known filter devices require much expenditure because due to the poor resistance of rectangular housings to shocks caused by pressure, such housings require a suitable housing wall thickness, on the one hand, and a multitude of explosion flaps on the other.

Furthermore, filter devices are known that consist of a container with a round cross section that is installed directly on a bunker (bunker attachment filters). These containers, however, are not themselves equipped with pressure relief devices, but the bunkers below are. As an alternative, such containers may be designed for the maximum pressure as well and therefore may not have any relief devices.

Therefore, the problem of the invention is to further develop a silo or a filter device of the specified type in such a way that it is capable with as little constructional expenditure as possible to absorb the occurring mechanical stresses and assure at the same time safe pressure relief.

SUMMARY OF THE INVENTION

In connection with a filter device of the type specified above, this problem is solved according to the invention in that at least one pressure relief element is arranged in the lid of the container, whereby the container space below the at least one pressure relief element is limited by a tubular element that is substantially vertically arranged in the container, and the tubular dry bulk material charging system is feeding into said tubular element.

A silo as defined by the invention, or such a filter device can be realized with substantially lower expenditure in terms of construction and thus at substantially lower cost because, first of all, only a relatively low container wall thickness is required on account of the round cross section of the container and the favorable strength properties of the container conditioned thereby.

Furthermore, the filter device is provided with an effective and also less costly pressure relief element because other than with known filter devices with a comparable capacity and with a rectangular shape, the at least one pressure relief element has to be arranged only in the region of the lid of the container, whereas additional pressure relief devices can be dispensed with. This is possible only because the dry bulk material is admitted in the special manner claimed, so that if any pressure shock should occur, the dry bulk material is directly guided in a controlled way in the direction of the at least one pressure relief element and no longer received within the area of the filter elements, so that safe uncoupling is assured.

In order to make use of the space of the container in an optimal manner, provision is advantageously made that the filter elements are arranged in the area between the tubular elements and the outer wall of the container.

Furthermore, provision is advantageously made that below the area receiving the filter elements, the container has the shape of a funnel. The dry bulk material removed in the form of a filter cake can then be discharged from the filter device in a particularly simple manner and transported, for example into a silo located downstream.

Provision is preferably made in connection with such a design that the tubular dry bulk material feeding system leads into the container in an inclined way versus the vertical line in the funnel-like region and feeds in the vertical position into the tubular element in the center.

So that the lid of the container can be designed saving as much material and weight as possible and is nonetheless adequately resistant to pressure thrust, provision is made in a particularly advantageous manner that the container lid is embodied in the form of a sandwich type of construction.

For that purpose, provision is made in a very particularly advantageous way that the container lid has an upper lid layer and a lower lid layer. These layers are connected with upwardly tapering, funnel-shaped lid elements, whereby the upper and the lower layers of the lid have recesses in the area of the funnel-shaped lid elements, and the layers of the lid are connected with the lid elements along such recesses all the way around.

Such an embodiment of the container lid offers very special benefits. Because of the sandwich type of construction, pressure stresses occur only on the lower layer of the lid of the pressure container, whereas the upper layer of the lid is subjected to tensile stress, which is relatively uncritical. The lower layer of the lid, however, which has to be dimensioned with adequate thickness because it is subjected to pressure stress, has only a very small surface area because it is penetrated by a multitude of the funnel-shaped lid elements, i.e. only the area between the lower ends of the funnel-shaped lid elements, said ends being open towards the interior space of the container, is forming the lower layer of the lid, and it is equipped with relatively small, adequately dimensioned metal sheets or the like. On the other hand, metal sheets with a substantially lower wall thickness can be used for the upper layer of the lid because it is only subjected to tensile stress.

Furthermore, provision is advantageously made that the funnel-shaped lid elements extend up to outside of the upper layer of the lid.

According to the invention, a modified embodiment consists in that in the center of the lid, provision is made in connection with such silo or filter devices for a truncated cone-shaped area that is tapering outwards and upwards and projecting beyond the upper layer of the lid. Said area is surrounded by concentric strips of sheet metal that are set inclined, in such a way that a triangular framework is formed in the lid as a sandwich construction viewed under the aspect of the cross section.

Such inclined, individual strips of sheet metal forming a sandwich construction and replacing truncated cones result in an optimal introduction of force in the event an explosion occurs within the container. For example, the forces directed outwards against the inclined strips of sheet metal cancel each other because of the circular shape all around, and the strips of sheet metal, which are directed against each other and set inclined all around, are in the same way capable of optimally transmitting and compensating the forces acting on them.

Other embodiments as defined by the invention consist in that the lid is equipped with a vertical, straight outer edge wall, and/or that a strip of sheet metal is secured on the outer edge wall. Such a strip of sheet metal extends the upper layer of the lid outwards and is extending all around and is forming a rectangular triangle.

In connection with the latter embodiment, the sandwich construction can practically be extended beyond the edge of the silo or filter, which is particularly useful if the devices have a comparatively small diameter and it is nonetheless intended to make provision for catwalks or work platforms along the edges that are extending all around, which can then be provided in the area of the lid by widening measures.

The central truncated cone surrounded by the strips of sheet metal may support, for example the aforementioned explosion door, or, in connection with another embodiment realized, for example in the form of a slightly differently designed silo, may support a filter head. If the latter is the case, it may be useful to arrange the explosion door eccentrically on the lid, as it is provided by the invention in a further developed embodiment as well.

BRIEF DESCRIPTION OF THE INVENTION

Further features, details and advantages of the invention can be derived from the following description as well as the drawing, in which.

DETAILED DESCRIPTION OF THE PREFERRED EMBODIMENTS

Figure 1:
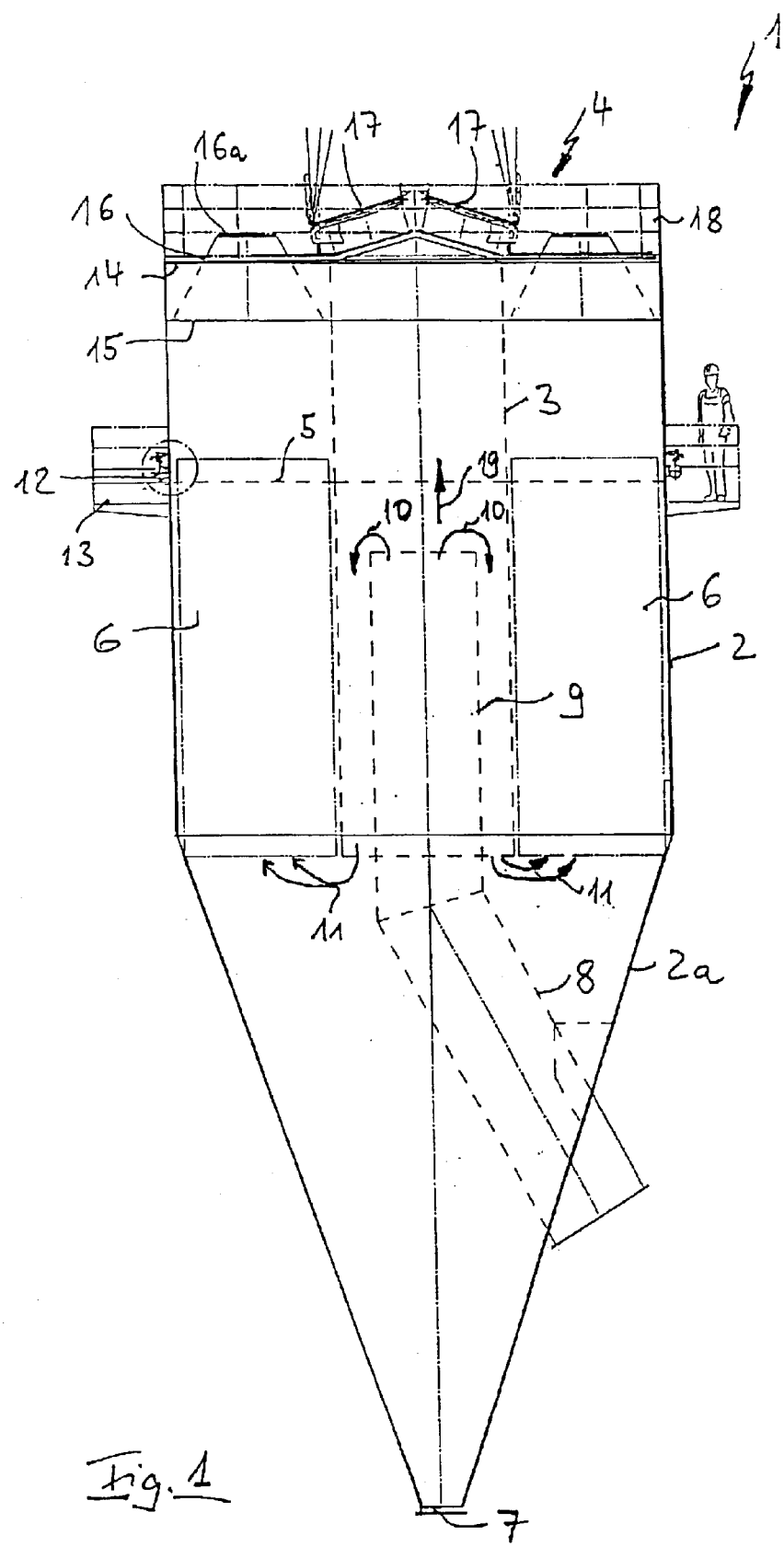
FIG. 1 is a side view of a filter device as defined by the invention.

A filter device for inflammable dry bulk materials as defined by the invention is generally denoted in the drawing by 1. Said filter device 1 first comprises a container 2 with a round cross section. The diameter of such a container 2 may be in the order of magnitude, for example from 5 to 10 m.

A vertically extending, tubular element 3 is centrally arranged in the cylindrical container 2. This element is secured at the top side on the container lid, which is generally denoted by 4. A multitude of the tubular filter elements 6, which are arranged in a suspended manner, are secured on a (perforated) bottom (ring) 5 in the area between the tubular element 3 and the outer wall of the container. Such filter elements are known per se.

Below the filter elements 6, the container 2 is designed in the form of a hopper. This hopper-shaped area is denoted by the reference symbol 2a. The lower end of the hopper-like area 2a is forming a dry bulk material discharge system 7; the design of the latter is not important in detail. From there, the dry bulk material can be admitted, for example into a silo or the like.

For feeding the dry bulk material into the filter device 1, preferably by means of air (vacuum suction feed), provision is made for a tubular dry bulk material charging device, which feeds into the center of the tubular element 3 in the container 2. This tubular dry bulk material charging device has a first area 8, which is extending in an inclined manner versus the vertical line in the hopper-shaped area 2a of the container 2 and leading into the latter, penetrates the container wall, and it continues into a vertically extending area 9 in the center in the tubular area 3.

Because of this design, the dry bulk material admitted under vacuum first enters through the dry bulk material feed system 8, 9 in the direction of the arrows 10, from the end of the dry bulk material 9 into the tubular element 3 and is then reversed in the direction of the arrows 10 because the tubular element 3 is closed laterally and upwards. The further flow then takes place in the direction of the arrows 11 to the filter elements 6, where the dry bulk material is collected as a filter cake on the outer sides of the filters, whereas the transporting air enters the filter elements 6 and is discharged in the usual way.

In order to remove the product, i.e. the dry bulk material from the filter elements 6 as a filter cake, provision is made in the manner known per se on the outer side of the container for a multitude of the compressed-air feeding devices 12, which are distributed over the circumference of the container 2. It is possible with such feeding devices to detach the filter cake from the filter elements 6, whereupon the filter cake then exits into the funnel-shaped area 2a of the container and can be discharged as the product by way of the dry bulk material discharging system 7. On the outer side, it is also possible to provide on the container 2 in the area of said compressed-air feeding devices 12 a work platform 13 that is extending all around.

Furthermore, the design of the container lid 4, which is embodied with very particular preference in the form of a sandwich construction, is essential to the filter device 1 as defined by the invention. For that purpose, the container lid 4 comprises an upper lid layer 14 and a lower lid layer 15. These lids are connected with each other by means of the upwardly tapering, funnel-shaped lid elements 16. The lid elements 16, which are closed on the top side (reference numeral 16a), are in this connection forming a part of the wall of the lid, i.e. the upper and the lower lid layers 14 and 15 have recesses along which the lid layers 14 and 15 are joined with the funnel-shaped lid elements 16 all the way around.

Since the funnel-shaped lid elements 16 are tapering upwards, their lower area is very large, i.e. the recesses 15a of the lower lid layer 15 assume a large part of the area of the lid layer 15, so that the actual lid layer 15 assumes only a small surface area between the funnel-shaped lid elements 16. Since the lower lid layer 15 is capable of substantially absorbing pressure stress and therefore has to have a substantial wall thickness, this design is particularly advantageous because the lower lid layer 15 has only a small surface area, i.e. only a small surface area between the lower ends accordingly needs to be dimensioned adequately, which can be realized in a simple manner, for example my using small pieces of sheet metal that can be welded to the lower edge of the lid elements 16.

Between the recesses for the lid elements 16, the upper lid layer 14 has a larger surface area than the lower lid layer 15; however, it nonetheless can be dimensioned with the use of metal sheets having a lower wall thickness because it substantially has to be capable of absorbing only tensile stress. Thus a particularly advantageous design of the lid of the filter device 1 is available, which by virtue of its sandwich construction comprising the additional, funnel-shaped lid elements 15, only requires a low weight in the presence of excellent strength properties, and a relatively low consumption of material. On the top side, the container lid is surrounded by a protective weir 18.

A further important advantage of such a lid construction of the container 2 is the fact that it is possible in the same manner to arrange in the center of the container 2 above the tubular element 1 one or preferably two or more pressure relief elements in the form of explosion doors, which are denoted by 17 and integrated in the sandwich roof construction of the container lid 4. Such explosion doors 17 are required only in the area of the tubular element 3 due to the design of the dry bulk material feeding system 8, 9, and the tubular element 3, because if a pressure shock and/or fire flash occurs in the dry bulk material, such a shock and/or flash, by virtue of the design, will exit from the dry bulk material feed 9 exclusively in the direction of the arrow 19 and enter on top the area of the tubular element 3, and will then be directly received by the explosion doors 17 arranged on top without being received in the other areas of the container 2. The explosion doors will open accordingly and provide for the pressure relief.

Figure 4:
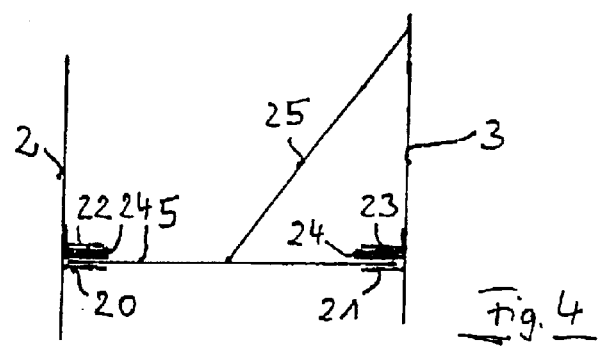
FIG. 4 shows an enlarged detail of the fastening system of the perforated floor.

FIG. 4 shows by an enlarged representation the fastening system for the perforated bottom ring 5, in which the filter elements (not shown there) are suspended. On the outer side, the bottom 5 is resting on a collar 20 of the outer wall of the container, which is extending all around and is at the same forming a stiffening of the container 2, and on the inner side on a collar 21 of the tubular element 3, said collar extending all around as well. The fastening angles 22, 23 are arranged with a spacing from each other above said collars 20, 21 on the outer wall of the container, as well as on the tubular element 3. With the bottom 5 resting on the collars 20 and 21, said bottom can be secured by driving the wooden wedges 24 between the fastening angles 22, 23 and the bottom 5. In addition, the bottom 5 is suspended in its center area on the flexible cables 25 in order to prevent it from sagging through. Said cables 25 are secured on the other end on the tubular element 3. If a pressure wave occurs in the container 2 in the upward direction, the bottom 5 is capable of easily detaching itself from its anchoring and lifting itself off upwards without causing any major damage.

Figure 2:
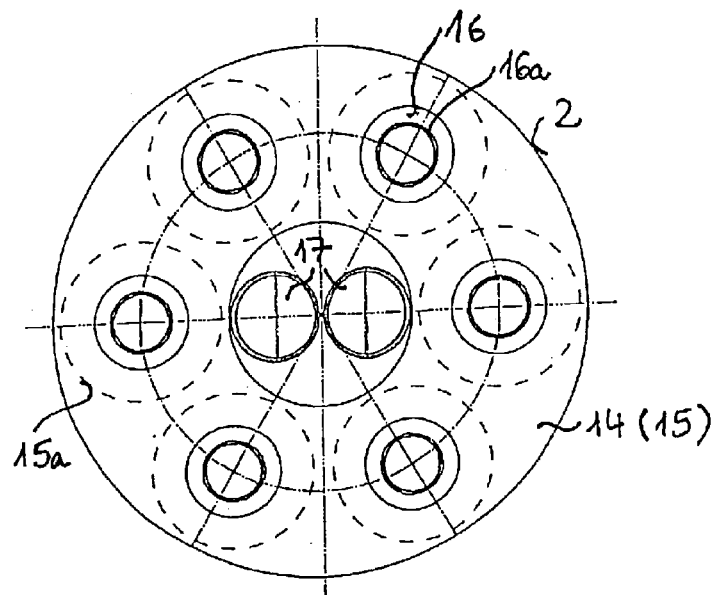
FIG. 2 is a top view of the filter device.
Figure 3:
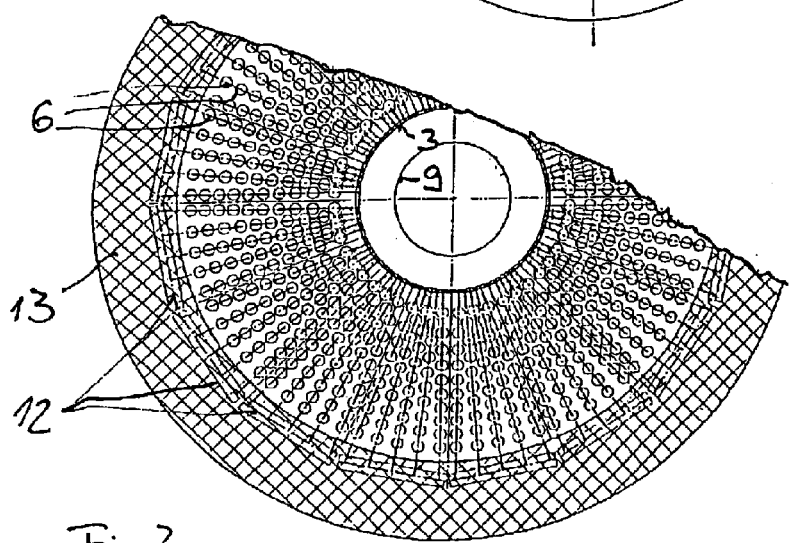
FIG. 3 is a section through the filter device at the level of the filter elements.
Figure 5:
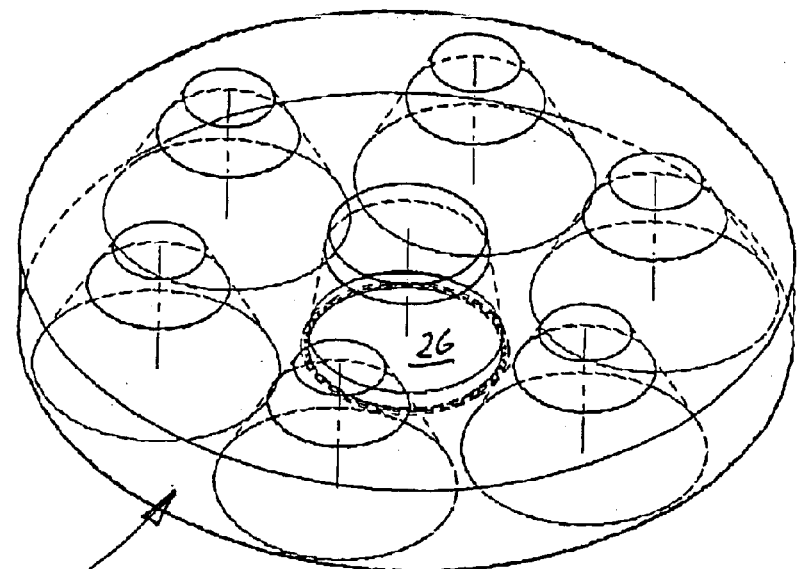
FIG. 5 is a three-dimensional representation of a "wire model" of the silo/filter lid.
Figure 6:
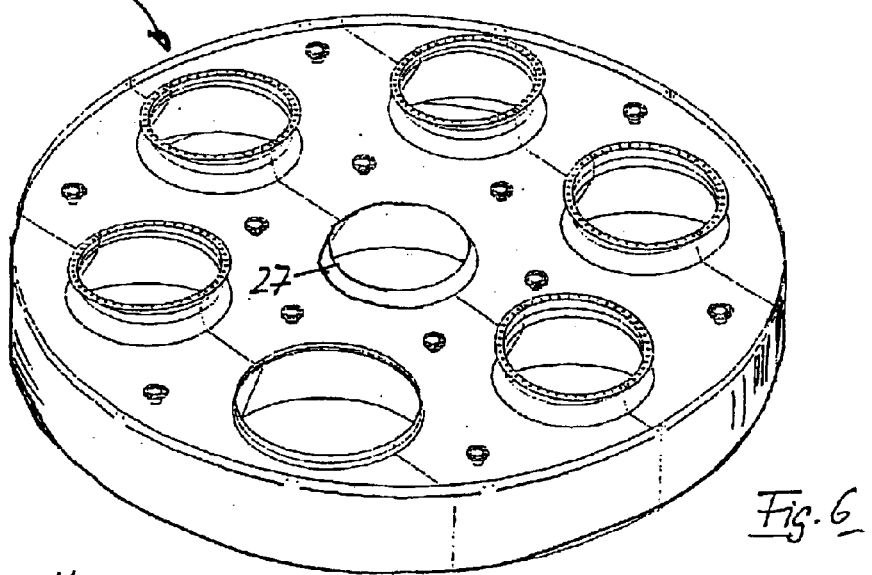
FIG. 6 is a three-dimensional representation with a view of the silo/filter lid from the top.
Figure 7:
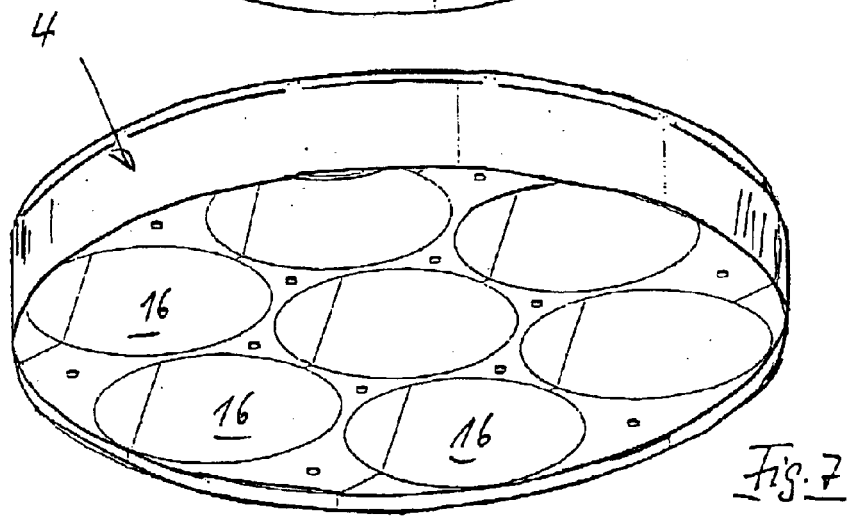
FIG. 7 is a three-dimensional view showing the silo-filter lid from the bottom.

Lid designs according to the above description are shown also in FIGS. 5 to 7, whereby FIG. 5 shows a so-called wire representation of a lid substantially conforming to the top view shown in FIG. 2; however, this lid comprises a central cylinder stump-shaped attachment 26 that is turned inside out upwards and arranged on the corresponding mounting collar 27 (FIG. 6).

Figure 8:
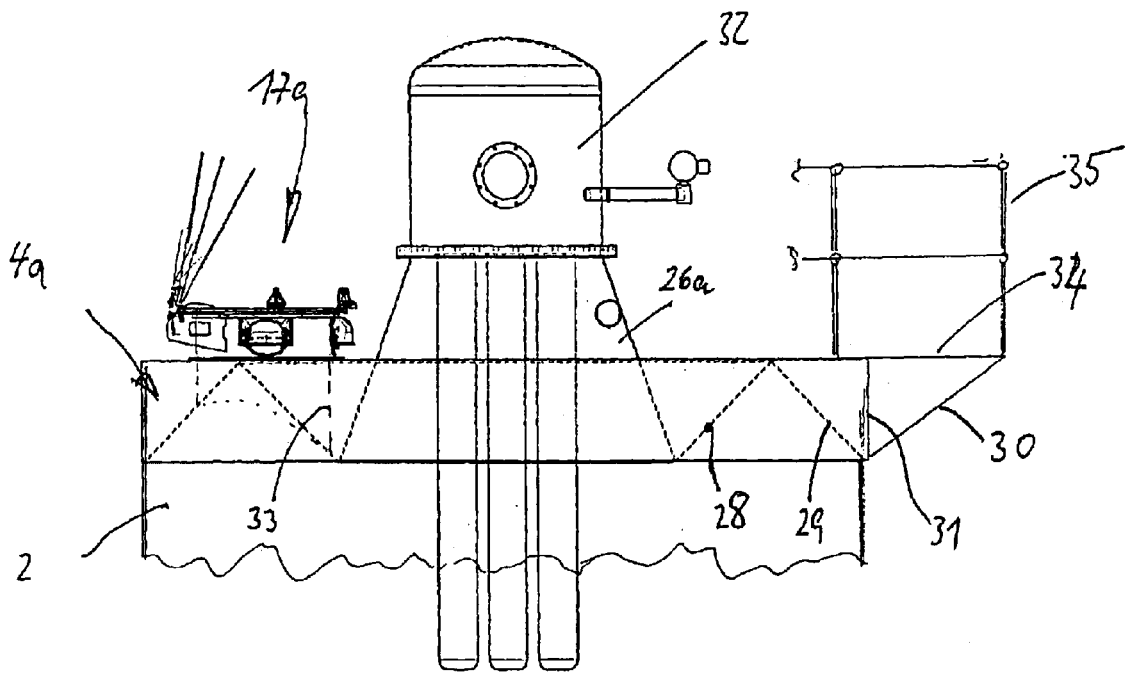
FIG. 8 shows a modified embodiment of the filter lid by a side view.
Figure 9:
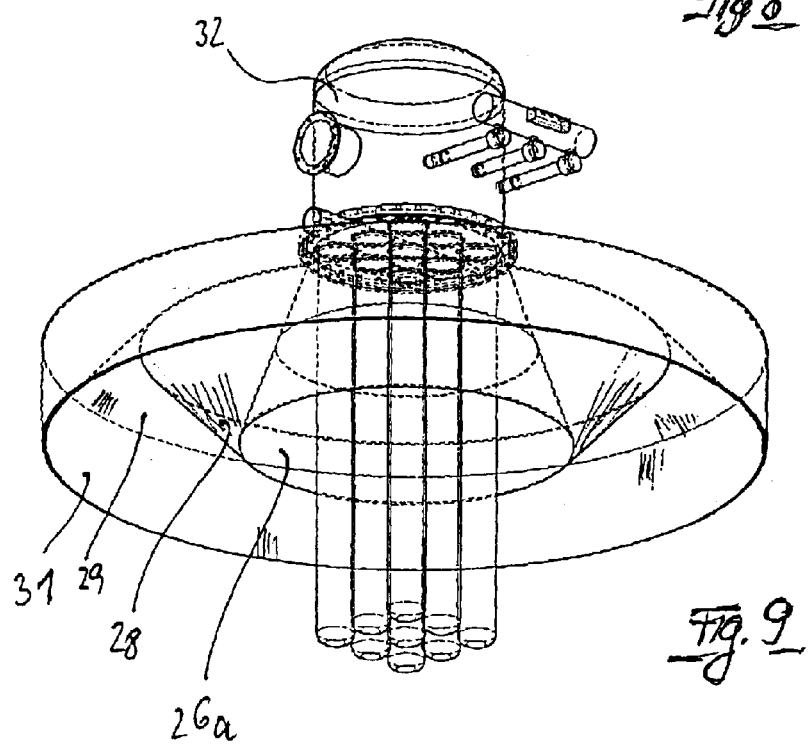
FIG. 9 shows the filter lid according to FIG. 8 from the bottom.

A slightly different, modified embodiment of the container lid is shown in FIGS. 8 and 9, where the container lid is generally denoted by 4a. The important difference versus the embodiment according to FIGS. 2 and 5 to 7 consists in that the lid 4a of the container 2 is provided there with its sandwich construction by making provision around the central cylinder cone denoted by 26a for the concentric metal sheets 28 and 29 that are set inclined and extending all around, and, if need be, for an additional metal sheet strip 30 that is widening the lid 4a outwardly. If necessary, these metal sheet and strip elements may be provided also with reinforcing elements, whereby the upper outer edge of the lid 4a is formed by the vertical metal edge sheet 31 extending all around.

The central truncated cone 26a may visibly support a filter or a filter cartridge generally denoted by 32, or also one or more explosion doors, whereby in the exemplified embodiment shown according to FIG. 8, the explosion door denoted by 17a is eccentrically arranged on a pipe 33 on the lid 4a.

The metal sheets 28 to 30 extending all around are forming around the central truncated cone 26a a framework-type structure,; however, without any substrate or any lower lid layer 15, with the result that pressure applied, for example to the metal sheets 29, for example in the event of an inside explosion in the silo 2, such pressures will mutually cancel each other by virtue of the configuration of the metal sheets extending all around, or their arrangement all around. If a catwalk for people is required all around and the surface area of the lid is too narrow, the lid can be enlarged outwards, which is achieved again in the form of a metal sheet 30 extending all around and accommodating a part area of the top metal sheet. This area is denoted in FIG. 8 by the reference numeral 34; a hand rail or railing is indicated and denoted by the reference numeral 35.

The exemplified embodiments of the invention described above naturally can be modified in many ways without vacating the basic idea. For example, in the exemplified embodiment of the invention according to FIGS. 8 and 9, provision can be made for additional metal sheets extending all around, and more of the like.

What is claimed is:

1. A receiving silo and/or filter device for inflammable dry bulk materials comprising a substantially cylindrical wall, a lid, a dry bulk material feeding and discharging system, as well as a pressure relief element opening at a predetermined pressure rise in the container, in particular with an explosion door and filter elements associated with the container, characterized in that at least one pressure relief element (17) is arranged in the container lid (4) particularly in the center area, whereby the chamber of the container is limited below the at least one pressure relief element (17) by a tubular element (3) that is arranged substantially vertically in the container (2) and into which the tubular dry bulk material charging system (9) is feeding.

2. The silo or filter device according to claim 1, characterized in that the filter elements (6) are arranged in the area between the tubular element (3) and the outer wall of the container.

3. The silo or filter device according to claim 1, characterized in that below the area receiving the filter elements, the container (2) has the shape of a funnel (2a).

4. The silo or filter device according to claim 3, characterized in that the tubular dry bulk material feeding system (8, 9) enters the funnels-shaped area (2*a*) inclined versus the vertical, and in the vertical position feeds into the tubular element (3) in the center.

5. The silo or filter device according to claim 1, characterized in that provision is made for a container lid (4, 4*a*) embodied as a sandwich construction, in particular that the container lid (4) has an upper lid layer and a lower lid layer (14, 15), said layers being connected with upwardly tapering, funnel-shaped lid elements (16) or inclined metal sheets (28, 29) extending all around, whereby, if necessary, the upper and the lower lid layers (14, 15) have recesses along which the lid layers (14, 15) are connected all around with the lid elements (16).

6. The silo or filter device according to claim 5, characterized in that the funnel-shaped lid elements (16) extend up to outside of the upper lid layer (14).

7. The silo or filter device according to claim 1, characterized in that in the center of the lid, provision is made for an outwardly and upwardly tapering, truncated cone-shaped area (26*a*) projecting beyond the upper layer of the lid, said area being surrounded by concentric, inclined sheet metal strips (28, 29), in such a way that a triangular framework is formed in the lid viewed in the cross section.

8. The silo or filter device in particular according to claim 7, characterized in that the lid is equipped with a vertical, straight outer edge wall (31) and/or that a strip of sheet metal forming a right-angled triangle is secured on the outer edge wall (31), said strip of sheet metal expanding the upper lid layer outwards and extending all around.

9. The silo or filter device according to claim 7, characterized in that the central truncated cone supports an explosion door or a filter head.

10. The silo or filter device according to claim 1, characterized in that the explosion door is eccentrically arranged on the lid.

* * * * *